United States Patent [19]
Brown

[11] 3,837,761
[45] Sept. 24, 1974

[54] GUIDE VANES FOR SUPERSONIC TURBINE BLADES
[75] Inventor: Robert O. Brown, Media, Pa.
[73] Assignee: Westinghouse Electric Corporation, Pittsburgh, Pa.
[22] Filed: Feb. 14, 1973
[21] Appl. No.: 332,458

Related U.S. Application Data
[62] Division of Ser. No. 173,486, Aug. 20, 1971, Pat. No. 3,751,182.

[52] U.S. Cl.................. 416/191, 416/196, 416/203
[51] Int. Cl............................................. F01d 5/22
[58] Field of Search.......................... 416/189–196, 416/201, 203, 175

[56] References Cited
UNITED STATES PATENTS

| | | | |
|---|---|---|---|
| 1,554,614 | 9/1925 | Allen .................................. | 416/193 |
| 2,091,677 | 8/1937 | Fredericks ...................... | 416/193 X |
| 2,772,854 | 12/1956 | Anxionnaz .......................... | 416/196 |
| 3,039,736 | 6/1962 | Pon.................................... | 416/192 X |
| 3,148,954 | 9/1964 | Haas................................ | 416/241 X |
| 3,304,056 | 2/1967 | Sohma ............................ | 416/241 X |
| 3,536,417 | 10/1970 | Stiefel et al......................... | 416/203 |
| 3,751,182 | 8/1973 | Brown............................. | 416/193 X |

FOREIGN PATENTS OR APPLICATIONS

| | | | |
|---|---|---|---|
| 284,312 | 5/1928 | Great Britain...................... | 416/193 |
| 671,512 | 9/1929 | France............................... | 416/193 |
| 221,559 | 5/1910 | Germany........................... | 416/203 |

*Primary Examiner*—Everette A. Powell, Jr.
*Attorney, Agent, or Firm*—F. J. Baehr, Jr.

[57] ABSTRACT

Guide vanes are installed between blades of the last stage of blading of a large steam turbine to form converging-diverging openings to minimize losses in this portion of the turbine. The guide vanes are fastened to adjacent blades through a shroud ring and through a lashing ring to connect the blades in such a manner as to reduce vibration and allow thermal expansion of the rotor.

3 Claims, 9 Drawing Figures

PATENTED SEP 24 1974  3,837,761
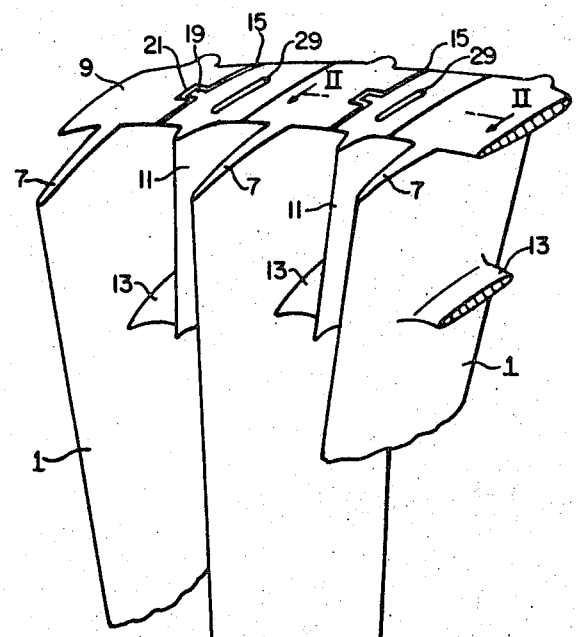
FIG. 1.
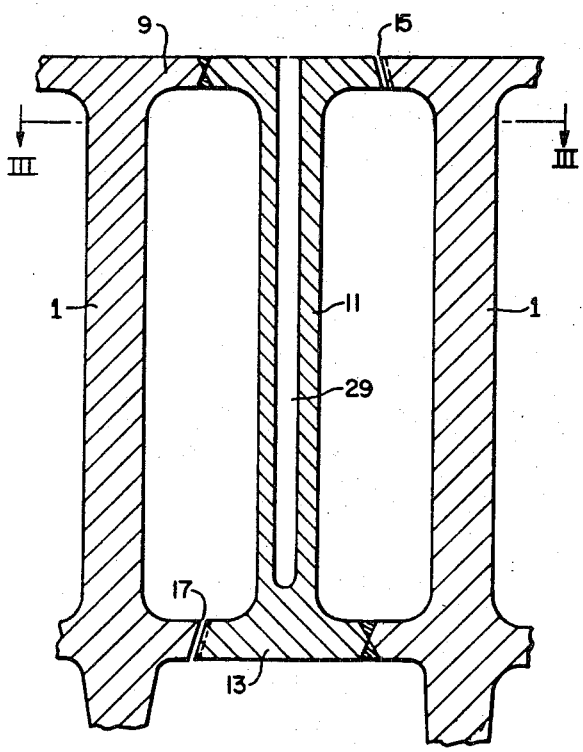
FIG. 2.
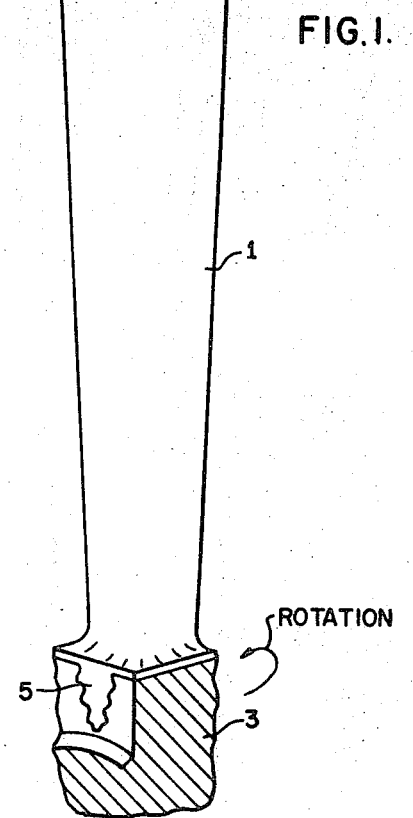

GUIDE VANES FOR SUPERSONIC TURBINE BLADES

This is a division of application Ser. No. 173,486 filed Aug. 20, 1971, which is now Pat. No. 3,751,182 issued Aug. 7, 1973.

BACKGROUND OF THE INVENTION

This invention relates to turbine blades, and more particularly, to an annular array of circumferentially spaced rotatable blades having a guide vane disposed between the blades adjacent their tips.

The large volumetric flow of steam encountered in the exhaust of large steam turbines utilized in present day power generating stations presents complex and challenging problems to the turbine designer. To facilitate passing a large volume of steam through the rotating blades, the open area must be large, resulting in long blades disposed on a large diameter rotor, thus producing high stresses in the rotating blades. These stresses may be the result of steady forces produced by rotating the blades at high speed or cycling forces produced by vibration caused by rotating the blades of flow-induced vibrations produced by the steam impinging upon the blades.

The blades generally have an air foil cross section, however, it is necessary to make substantial changes in the shape and angle of the blades, as the blades extend radially outward from their root due to the change in the linear speed of the blades from their root to their tip, to insure that the steam leaves the blades at the proper angle. The tip speeds become supersonic, when dealing with large diameter blading, increasing the complexity of designing the optimum blade. For additional information relating to blades designed for supersonic steam velocities reference may be made to U.S. Pat. Nos. 3,565,548 and 3,302,925.

SUMMARY OF THE INVENTION

In general, a turbine having a rotor, an annular array of circumferentially spaced rotatable blades fastened to the rotor and a casing encircling the blades and rotor, when made in accordance with this invention, comprises a shroud ring, a lashing ring and a guide vane cooperatively associated to connect adjacent blades to minimize flow losses, to reduce vibration, and to provide for thermal expansion of the blades.

BRIEF DESCRIPTION OF THE DRAWINGS

The objects and advantages of this invention will become more apparent from reading the following detailed description in connection with the accompanying drawings, in which corresponding reference characters indicate corresponding portions in the various drawings and in which:

FIG. 1 is a partial perspective view of an annular array of rotatable blades for turbine made in accordance with this invention and having guide vanes desposed between adjacent blades;

FIG. 2 is an enlarged partial vertical sectional view taken on line II—II of FIG. 1;

DESCRIPTION OF THE PREFERRED EMBODIMENT

Figure 3:
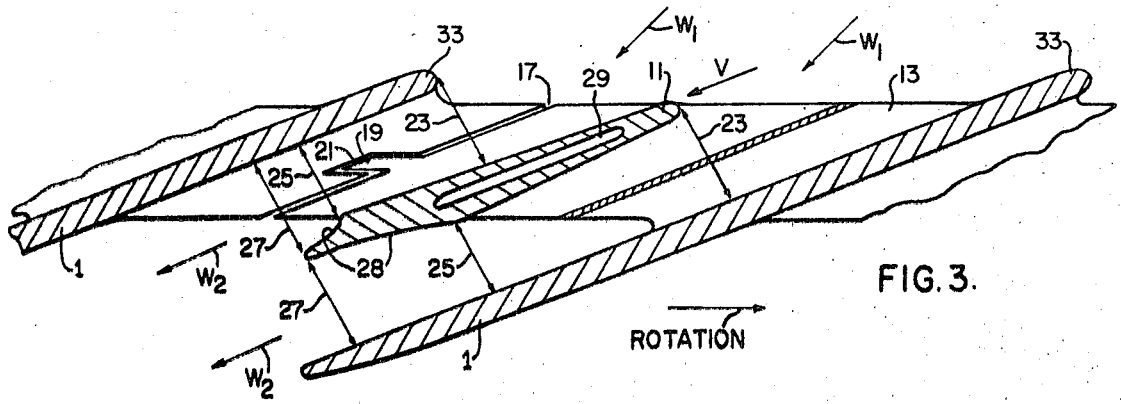
FIG. 3 is an enlarged partial sectional view taken on line III—III of FIG. 2.

Referring now to the drawings in detail, FIG. 1 shows a portion of an annular array of rotatable blades for a steam turbine (not shown). The blades 1 are fastened to a rotor 3 at their root or base 5 and extend radially outwardly, twisting substantially and changing in shape as they progress to their tip 7 to provide the optimum air foil shape for each linear speed as diameter of the array of blades increases. A shroud ring 9 encircles the blades and is fastened to the tips thereof as will be described in detail hereinafter. A guide vane 11 is disposed between each pair of blades adjacent the tip ends 7 thereof. The guide vanes 11 are fastened to the shroud ring 9 and to a lashing ring 13. The guide vanes 11 are, thus, disposed adjacent the tip end of the blade, they generally extend over that portion of the blade, which is subjected to supersonic steam flow. Generally the outer third of the blade has steam velocities sufficiently supersonic to warrent this special design consideration. The exact length of the guide vanes is determined by considering the combined requirements of proper length for tuning against resonant frequencies as well as optomizing the length of the supersonic flow passage.

As shown in FIG. 2, the guide vanes 11 are fastened to one adjacent blade 1, the one on the left in FIG. 2, through the shroud ring 9, and to the other adjacent blade, the one on the right in FIG. 2, through the lashing ring 13. When the shroud ring 9 and lashing ring 13 are made integral with the blades and guide vanes, as shown in FIG. 2, the guide vane 11 is welded to one of the adjacent blades by providing a weld in the shroud ring and the guide vane is fastened to the other adjacent blade by providing a weld in the lashing ring. Split bevel joints 15 and 17 are disposed in the shroud ring 9 and lashing ring 13, respectively, between the blades 1 and the guide vanes 11 on the opposite sides of the guide vanes from the welds hereinbefore described. The bevels are so disposed to form an oblique angle with the guide vane, so that as the guide vane moves radially outwardly with respect to the adjacent blades, the joint tends to tighten or close, thus providing a mechanical dampening between adjacent blades. The beveled joints 15 and 17 are provided with a tongue and groove 19 and 21, respectively, to prevent relative axial movements of the blades and guide vanes. The guide vanes 11, shroud ring 9 and lashing ring 13 are thus, cooperatively associated to form a "Z" or zig-zag shape joint between adjacent blades, which is sufficiently flexible to allow for thermal expansion of the rotor. While FIG. 1 shows the shroud ring 9 covering the entire blade tip, it should be understood that it may be any shape, i.e., it may be shaped similar to the lashing ring 13.

As shown in FIG. 3, the guide vane 11 is so disposed between adjacent blades and so shaped to provide a pair of openings having a converging-diverging cross section. Each opening has an inlet 23, throat 25 and exit 27 portion and the opened area of the respective portion of each converging-diverging cross sectional opening is generally equal, providing equal flow through the opening on each side of each guide vane. Steam indicated by the reference character $\omega_1$ enters the inlet 23 at subsonic velocities, that is a velocity less than Mach 1 (the Mach number being the ratio of the velocity of the fluid to the velocity of sound in the fluid), increases in velocity as it approaches the throat 25 in the converging portion to generally sonic velocity, Mach 1, and then continues to increase in velocity as the steam is expanded in the diverging portion between the throat 25 and the exit 27, wherein the velocity of the steam becomes supersonic or exceeds Mach 1. The diverging passages and particularly the concave curve surfaces 28 of the guide vanes are so proportioned to properly expand the fluid to the desired supersonic velocity with minimal losses. The guide vanes 11 are so disposed with respect to the blades 1 that the fluid or steam leaving the guide vanes (indicated by the reference character $\omega_2$) remains under the influence of the blades for a short distance to insure that the fluid leaves the blades at the proper angle to optimize the efficiency of the array of blades.

Each guide vane 11 has a central opening 29 extending partially therethrough to reduce the mass of the guide vane and thus the stress on the adjacent blades, which must provide support for the guide vanes.

Figure 4:
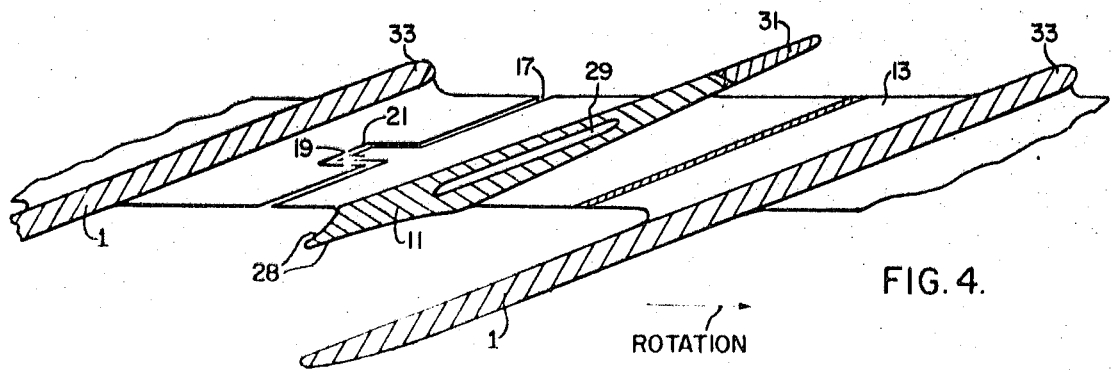
FIG. 4 is an enlarged partial sectional view similar to FIG. 3 showing a modification.

FIG. 4 shows a modification, in which a leading edge 31 of the guide vane 11 extends upstream of leading edges 33 of the blade 1 to provide an erosion-corrosion shield to protect the blades from moisture entrained in the steam. The leading edges 31 of the guide vanes 11 are made of a corrosion, erosion resistant material, such as Stellite. Being disposed adjacent the tips of the blades, the guide vanes are generally located in the area subject to the most severe corrosion and erosion, and by providing a leading edge which extends beyond the leading edge of the blades. The guide vanes thus provide a shield to protect the rotatable blades, which are larger and much more expensive, from erosion and corrosion caused by moisture entrained in the steam. The operation of the shield is best understood by referring to FIG. 4 or 9 wherein the relative velocity of the water droplets with respect to the blades is indicated at V. It should be noted because of the angle of approach B of the water droplets the shield prevents the water droplets from contacting the adjacent blade.

Figure 5:
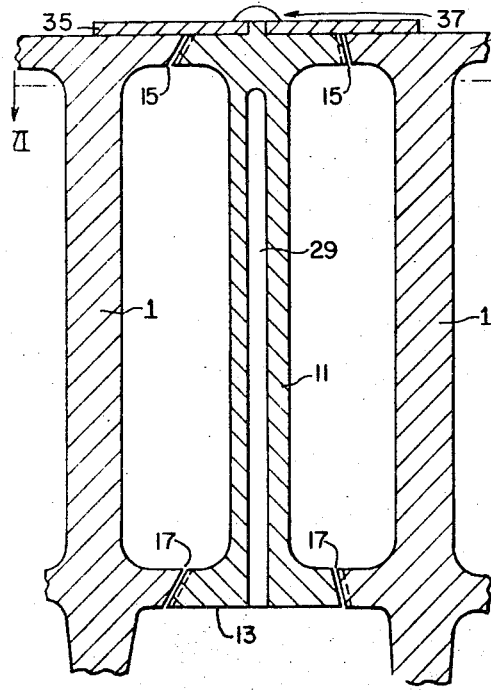
FIG. 5 is an enlarged partial vertical sectional view similar to FIG. 2 showing another modification.

FIG. 5 shows a modification in which a pair of bevel joints 15 are disposed in the shroud ring 9 and a pair of bevel joints 17 are disposed in the lashing ring 13. Each joint has a tongue and groove 19 and 21 disposed therein to locate the guide vane axially with respect to the blades and to prevent axial movement of the guide vane with respect to the blades. The bevel joints 15 and 17 are so disposed that the guide vanes wedge themselves between adjacent blades as the blades rotate. A keeper or holding strip 35 is disposed at the tip of the blade and is riveted to the guide vanes 11 as indicated at 37, keeping the guide vanes in place, when the array of blades is not rotating. As the array of blades rotates, centrifugal force causes the guide vanes to be biased radially outwardly increasing the wedging action of the guide vanes and providing mechanical dampening between blades to minimize vibrations. The bevel joints 15 and 17 also provide sufficient flexibility between blades to allow for thermal expansion and contraction of the rotor.

Figure 6:
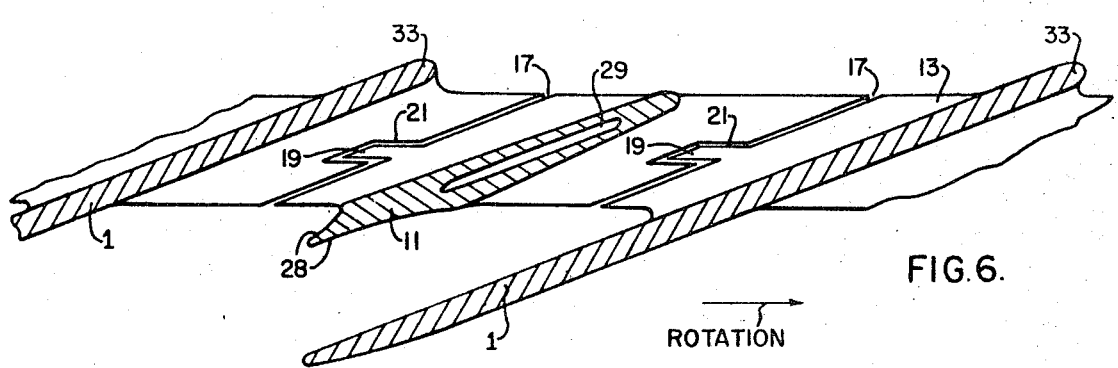
FIG. 6 is an enlarged partial sectional view taken on line VI—VI of FIG. 5.

FIG. 6 shows how the tongue and grooves 19 and 21 are arranged in the lashing ring to prevent axial movement of the guide vanes with respect to the adjacent blades.

Figure 7:
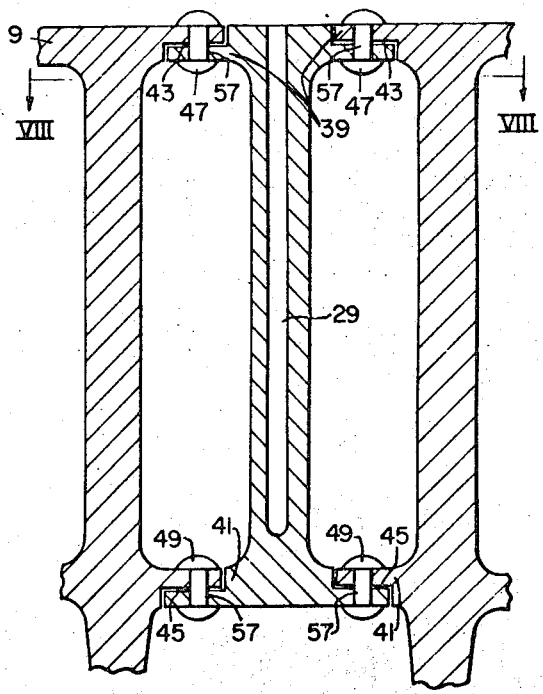
FIG. 7 is an enlarged partial vertical sectional view similar to FIG. 2 showing another modification.

FIG. 7 shows a modification, in which the guide vanes 11 are riveted in place. The shroud rings 9 and lashing rings 13 are formed from segments 39 and 41 made integral with the blades 1 and guide vanes 11. The segments 39 and 41 each have steps 43 and 45 so disposed that the steps register to provide a substantially continuous shroud ring 9 or leashing ring 13. Rivets 47 and 49 extend through the segments 39 and 41 to fasten the guide vanes to the blades. The rivets 47 and 49 are so disposed that they are not subjected to radial stresses as the blades rotate. Their function is to maintain the position of the guide vanes relative to the blades. The shroud ring and lashing ring are formed from the segments 39 and 41 and support the guide vanes.

Figure 8:
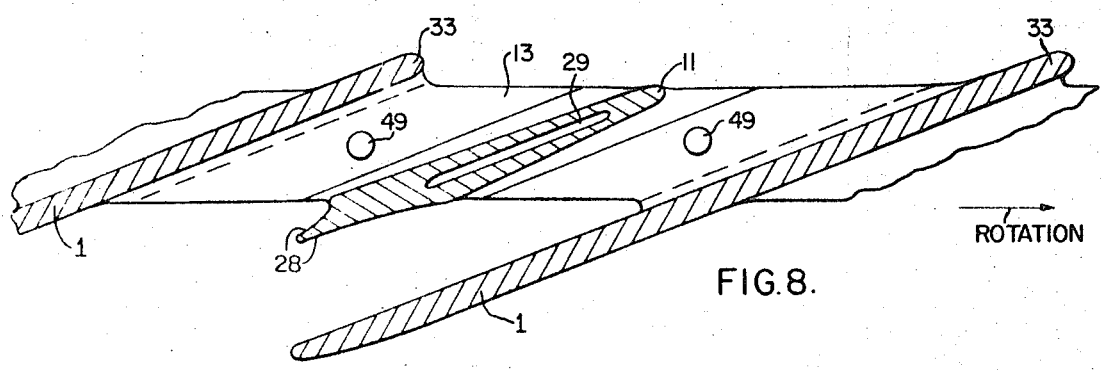
FIG. 8 is an enlarged partial sectional view taken on line VIII—VIII of FIG. 7.
Figure 9:
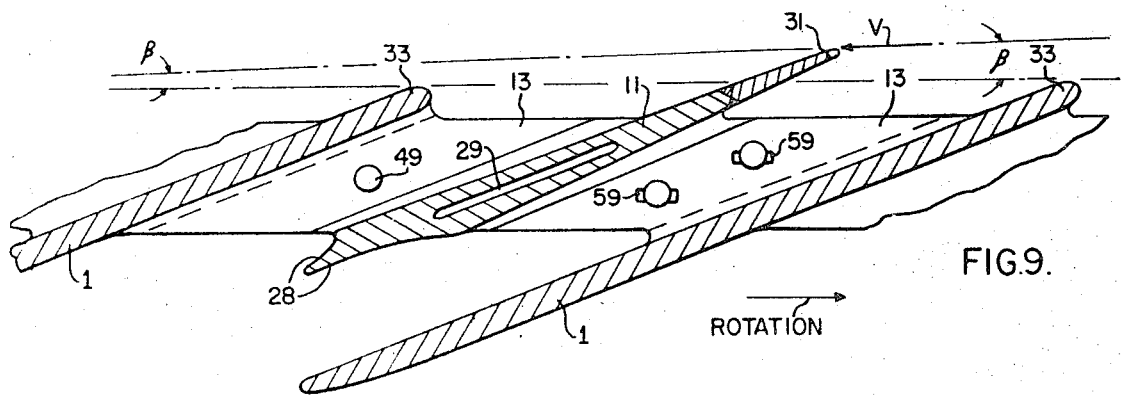
FIG. 9 is an enlarged partial sectional view similar to FIG. 8 showing a modification.

As shown in FIGS. 7, 8, and 9, the holes 57 for the rivets 47 may be sized to fit the rivets tightly or they may be slots 59, which allow relative movement between the guide vane and the adjacent blade to provide sufficient flexibility between adjacent blades to allow for thermal expansion and yet to provide sufficient rigidity to reduce vibrations.

Guide vanes, thus formed and disposed adjacent the tips of the blades, minimize the losses caused by supersonic steam flow in long last row blading for a steam turbine when utilized with blades of generally standard configuration. The guide vanes and not the blades are formed to produce the desired shaped passageways, thus reducing the cost of providing these passageways. Such guide vanes also cooperate with adjacent blades to reduce vibrations, and to provide sufficient flexibility to allow for thermal expansion and contraction of the rotor.

What is claimed is:

1. A steam turbine operated by steam having entrained moisture therein, said turbine having a rotor and an annular array of circumferentially spaced rotatable blades fastened to said rotor, said blades having a shroud ring, a lashing ring and guide vane disposed therebetween and cooperatively associated therewith to connect adjacent blades to minimize flow losses, to reduce vibration therein and to provide for thermal expansion of said rotor and blades, the blades and guide vanes each have rounded leading edges and the leading edges of the guide vanes are disposed upstream of the leading edges of the blades whereby the guide vanes protect the rotatable blades from erosion and corrosion caused by the entrained moisture in the steam.

2. A turbine as set forth in claim 1, wherein the leading edges of the guide vanes are made of an erosion and corrosion resistant material.

3. A turbine as set forth in claim 1, wherein the leading edges of the guide vane are made of stellite.

* * * * *